United States Patent
Maehara

(10) Patent No.: US 12,338,153 B2
(45) Date of Patent: Jun. 24, 2025

(54) METHOD FOR PRODUCING MIXED RAW MATERIAL, METHOD FOR PRODUCING MOLTEN GLASS, METHOD FOR PRODUCING GLASS ARTICLE, APPARATUS FOR PRODUCING MOLTEN GLASS, AND APPARATUS FOR PRODUCING GLASS ARTICLE

(71) Applicant: AGC Inc., Tokyo (JP)

(72) Inventor: Terutaka Maehara, Tokyo (JP)

(73) Assignee: AGC Inc., Tokyo (JP)

( * ) Notice: Subject to any disclaimer, the term of this patent is extended or adjusted under 35 U.S.C. 154(b) by 405 days.

(21) Appl. No.: 17/659,556

(22) Filed: Apr. 18, 2022

(65) Prior Publication Data
US 2022/0242770 A1 Aug. 4, 2022

Related U.S. Application Data

(63) Continuation of application No. PCT/JP2020/039382, filed on Oct. 20, 2020.

(30) Foreign Application Priority Data

Oct. 23, 2019 (JP) .................. 2019-193025

(51) Int. Cl.
*C03B 1/02* (2006.01)
*B01D 53/62* (2006.01)
(Continued)

(52) U.S. Cl.
CPC ................ *C03B 1/02* (2013.01); *B01D 53/62* (2013.01); *B01D 53/78* (2013.01); *C03B 5/235* (2013.01);
(Continued)

(58) Field of Classification Search
CPC ................................... C03C 1/02; C03B 3/02
See application file for complete search history.

(56) References Cited

U.S. PATENT DOCUMENTS

| | | | |
|---|---|---|---|
| 2,537,043 A | * | 1/1951 | Egli ................. C04B 35/14 117/224 |
| 4,211,568 A | | 7/1980 | Davis |

(Continued)

FOREIGN PATENT DOCUMENTS

| | | | |
|---|---|---|---|
| CN | 101734777 A | * | 6/2010 |
| CN | 103466637 A | * | 12/2013 |

(Continued)

OTHER PUBLICATIONS

Beerkens, R.G.C., et al. "Reactions of alkali vapours with silica based refractory in glass furnaces, thermodynamics and mass transfer", Physics and Chemistry of Glasses, vol. 46, No. 6, Dec. 2005, pp. 583-594. 12 pages.

(Continued)

*Primary Examiner* — Erin Snelting
*Assistant Examiner* — Steven S Lee
(74) *Attorney, Agent, or Firm* — Oblon, McClelland, Maier & Neustadt, L.L.P.

(57) ABSTRACT

A mixed raw material producing method for producing a mixed raw material includes preparing a glass raw material and an aqueous solution of sodium hydroxide; causing the aqueous solution to absorb carbon dioxide gas, to deposit sodium hydrogen carbonate in the aqueous solution; and mixing the sodium hydrogen carbonate with the glass raw material, to obtain a mixed raw material to be charged into a melting furnace.

12 Claims, 8 Drawing Sheets

(51) Int. Cl.
  *B01D 53/78*   (2006.01)
  *C03B 5/235*   (2006.01)
  *C03B 25/04*   (2006.01)

(52) U.S. Cl.
  CPC ........ *C03B 25/04* (2013.01); *B01D 2251/304* (2013.01); *B01D 2251/604* (2013.01); *B01D 2257/504* (2013.01); *B01D 2258/0241* (2013.01)

(56) References Cited

U.S. PATENT DOCUMENTS

| | | | | |
|---|---|---|---|---|
| 4,293,324 | A * | 10/1981 | Saeman | B01J 2/12 264/117 |
| 4,372,774 | A * | 2/1983 | Cross | C03B 27/0413 65/114 |
| 10,173,917 | B2 | 1/2019 | Yamazaki et al. | |
| 2004/0050106 | A1* | 3/2004 | Murnane | C03C 1/026 65/134.8 |
| 2004/0213705 | A1* | 10/2004 | Blencoe | C01F 5/24 423/220 |
| 2006/0193765 | A1* | 8/2006 | Nakashima | C01D 7/10 423/422 |
| 2008/0264831 | A1* | 10/2008 | Stenger | B01D 53/62 422/256 |
| 2009/0305378 | A1* | 12/2009 | Brent | C04B 7/367 423/430 |
| 2011/0203939 | A1* | 8/2011 | Jones | B01D 53/62 205/555 |
| 2012/0034144 | A1* | 2/2012 | Jones | C01B 32/60 423/220 |
| 2012/0248474 | A1 | 10/2012 | Ebihara | |
| 2013/0230442 | A1* | 9/2013 | Wei | B01D 53/62 423/226 |
| 2016/0332905 | A1* | 11/2016 | Yamazaki | C03B 17/064 |
| 2018/0243681 | A1* | 8/2018 | Stauffer | B01D 53/1425 |
| 2022/0048802 | A1 | 2/2022 | Maehara et al. | |

FOREIGN PATENT DOCUMENTS

| | | | | |
|---|---|---|---|---|
| CN | 108970362 A | * | 12/2018 | |
| EP | 3363523 A1 | * | 8/2018 | ......... B01D 53/1475 |
| EP | 3384973 A1 | * | 10/2018 | |
| JP | 49-31717 A | | 3/1974 | |
| JP | 57-17430 A | | 1/1982 | |
| JP | 2004-203673 A | | 7/2004 | |
| JP | 2005-537211 A | | 12/2005 | |
| JP | 4724996 B2 | | 7/2011 | |
| JP | 2012-1392 A | | 1/2012 | |
| JP | 2012001392 A | * | 1/2012 | |
| JP | 2012-204256 A | | 10/2012 | |
| JP | 2012-206872 A | | 10/2012 | |
| JP | 2014156375 A | * | 8/2014 | |
| JP | 2016-204256 A | | 12/2016 | |
| JP | 6402274 B1 | * | 10/2018 | ............ B01D 53/18 |
| WO | WO 01/14254 A1 | | 3/2001 | |
| WO | WO 2006/021993 A1 | | 3/2006 | |

OTHER PUBLICATIONS

C. Anderson et al., "Developments in the CO2CRC UNO MK 3 Process: A Multi-component Solvent process for Large Scale $CO_2$ Capture", Energy Procedia, 37 (2013) 225-232. 8 pages.

International Search Report issued Dec. 8, 2020 in PCT/JP2020/039382 filed on Oct. 20, 2020, 3 pages.

* cited by examiner

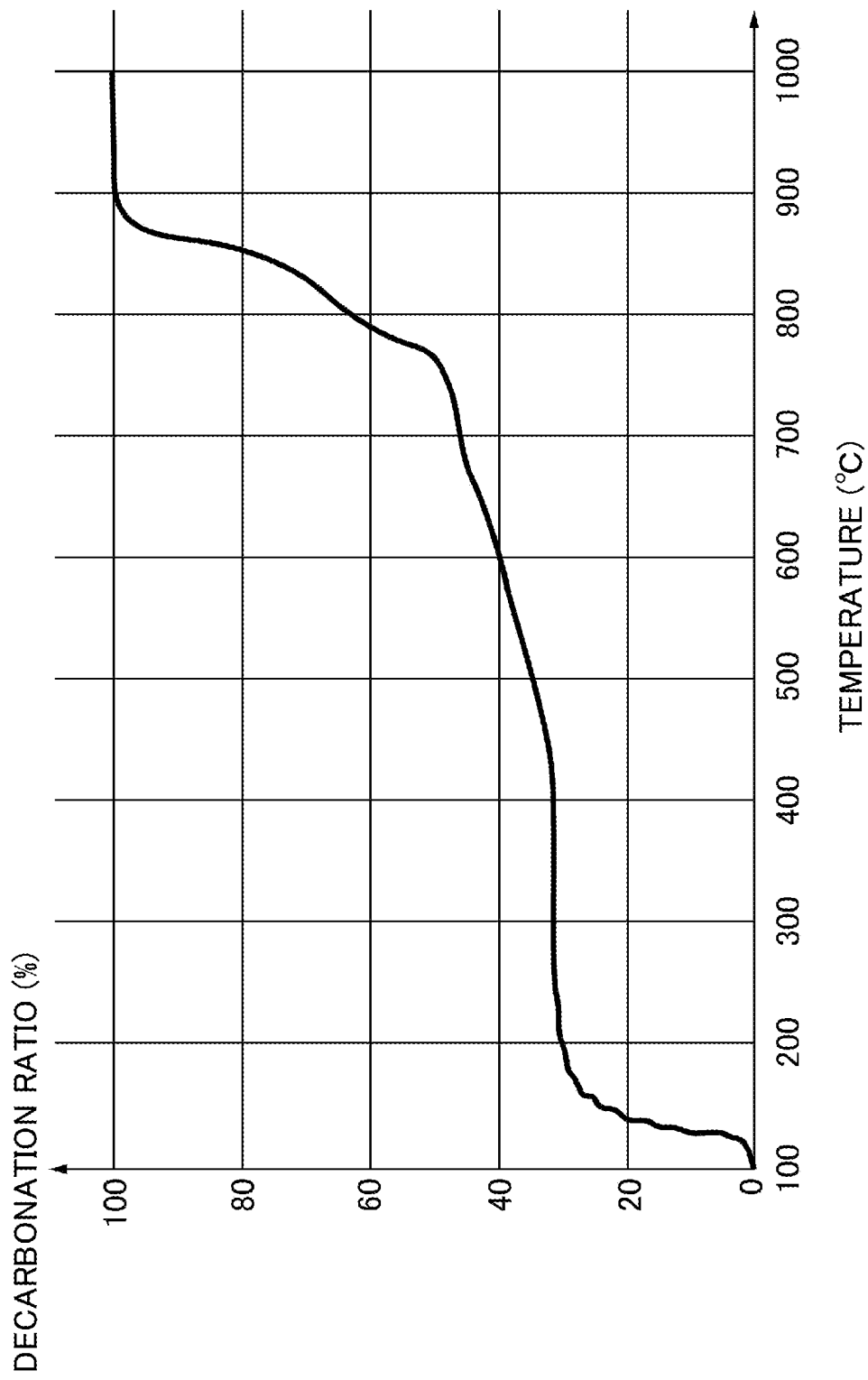

METHOD FOR PRODUCING MIXED RAW MATERIAL, METHOD FOR PRODUCING MOLTEN GLASS, METHOD FOR PRODUCING GLASS ARTICLE, APPARATUS FOR PRODUCING MOLTEN GLASS, AND APPARATUS FOR PRODUCING GLASS ARTICLE

CROSS-REFERENCE TO RELATED APPLICATION

The present application is a continuation application of International Application No. PCT/JP2020/039382, filed Oct. 20, 2020, which claims priority to Japanese Patent Application No. 2019-193025 filed Oct. 23, 2019. The contents of these applications are incorporated herein by reference in their entirety.

BACKGROUND OF THE INVENTION

1. Field of the Invention

The present disclosure relates to a method for producing a mixed raw material, a method for producing molten glass, a method for producing a glass article, an apparatus for producing molten glass, and an apparatus for producing a glass article.

2. Description of the Related Art

Carbon dioxide gas is generated in a process of producing molten glass. Carbon dioxide gas is a greenhouse gas and is thought to contribute to global warming. Therefore, reduction of carbon dioxide gas generation is required.

Sources of carbon dioxide gas in the process of producing molten glass are broadly classified into fuel such as natural gas and carbonate, which is a raw material for glass. Combustion of the fuel generates carbon dioxide gas. Pyrolysis of carbonate also generates carbon dioxide gas.

Carbonates are widely used as raw materials for glass because they are stable at normal temperature in the atmosphere and inexpensive. For example, sodium carbonate ($Na_2CO_3$) is commonly used as a sodium source of glass.

In U.S. Pat. No. 4,211,568 and Japanese Unexamined Patent Application Publication No. S49-31717, sodium hydroxide (NaOH) is used as the sodium source of glass. NaOH does not contain carbon, and is not a source of carbon dioxide gas. NaOH is normally distributed in a form of an aqueous solution.

However, NaOH has a high vapor pressure and has strong corrosiveness against bricks of a melting furnace (see, for example, R. G. C. Beerkens and O. S. "Verheijen, Reactions of alkali vapours with silica based refractory in glass furnaces, thermodynamics and mass transfer" Physics and Chemistry of Glasses, Volume 46, Number 6, December 2005, pp-583-594). Therefore, $Na_2CO_3$ is generally used as the sodium source of glass, as described above.

Sodium compounds further include sodium hydrogen carbonate ($NaHCO_3$) in addition to $Na_2CO_3$ and NaOH. $NaHCO_3$ is used, for example, in hemodialysis.

WO 2006/021993 and Japanese Patent No. 4724996 disclose a method for producing $NaHCO_3$. Specifically, they disclose causing an aqueous solution containing sodium ions to react with carbon dioxide gas to precipitate $NaHCO_3$.

Because a molar ratio of carbon (C) atoms to sodium (Na) atoms in $NaHCO_3$ is twice the molar ratio in $Na_2CO_3$, a generation amount of carbon dioxide gas from $NaHCO_3$ is twice the generation amount from $Na_2CO_3$. Thus, conventionally $NaHCO_3$ has not been used for the sodium source of glass.

A technique related to CCS (Carbon dioxide Capture and Storage) is disclosed, for example, in C. Andeson et al., Developments in the CO2CRC UNO MK 3 Process: A Multi-component Solvent Process for Large Scale CO2 Capture, Energy Procedia, 37, 2013, 225-232 (hereinafter, referred to as "Anderson"). In this technique, carbon dioxide gas is absorbed into an aqueous solution of potassium carbonate ($K_2CO_3$), to form potassium hydrogen carbonate ($KHCO_3$). Carbon dioxide gas can be extracted by heating $KHCO_3$.

Anderson merely discloses separating carbon dioxide gas from gases other than carbon dioxide gas, and does not disclose reducing a generation amount of carbon dioxide gas.

SUMMARY OF INVENTION

Problem to be Solved by the Invention

One aspect of the present disclosure provides a technique for reducing a generation amount of carbon dioxide gas in a process of producing molten glass.

Means for Solving Problems

According to an aspect of the present disclosure, a mixed raw material producing method for producing a mixed raw material includes
preparing a glass raw material and an aqueous solution of sodium hydroxide;
causing the aqueous solution to absorb carbon dioxide gas, to deposit sodium hydrogen carbonate in the aqueous solution; and
mixing the sodium hydrogen carbonate with the glass raw material, to obtain a mixed raw material to be charged into a melting furnace.

The mixed raw material producing method according to the aspect of the present disclosure may further include
heating the mixed raw material, before charging the mixed raw material into the melting furnace, to convert the sodium hydrogen carbonate to sodium carbonate, and to obtain the carbon dioxide gas.

In the mixed raw material producing method according to the present disclosure,
the mixed raw material may be heated using heat of an exhaust gas from the melting furnace.

In the mixed raw material producing method according to the present disclosure,
the mixed raw material is preferably heated at a temperature of from 100° C. to 900° C.

The mixed raw material producing method according to the aspect of the present disclosure may further include
acquiring the carbon dioxide gas from an exhaust gas from the melting furnace.

The mixed raw material producing method according to the aspect of the present disclosure may further include
granulating the mixed raw material, before charging the mixed raw material into the melting furnace, to obtain a briquette; and
using the briquette as the mixed raw material.

According to another aspect of the present disclosure, a molten glass producing method for producing molten glass includes charging the mixed raw material obtained by the mixed raw material producing method into the melting furnace; and melting the mixed raw material in the melting furnace, to obtain molten glass.

In the molten glass producing method according to the aspect of the present disclosure, the mixed raw material obtained by the mixed raw material producing method is preferably charged into the melting furnace without cooling the mixed raw material to a normal temperature, molten in the melting furnace, and obtained as the molten glass.

According to yet another aspect of the present disclosure, a glass article producing method for producing a glass article includes forming the molten glass obtained by the molten glass producing method; and annealing the formed glass, to obtain a glass article.

According to still another aspect of the present disclosure, a molten glass producing apparatus for producing molten glass includes a raw material tank that stores a glass raw material;

an aqueous solution tank that stores an aqueous solution of sodium hydroxide;

an absorption tank that causes the aqueous solution transferred from the aqueous solution tank to absorb carbon dioxide gas, to deposit sodium hydrogen carbonate;

a mixer that mixes the glass raw material transferred from the raw material tank with the sodium hydrogen carbonate transferred from the absorption tank, to obtain a mixed raw material;

a storage tank that stores the mixed raw material transferred from the mixer; and a melting furnace that melts the mixed raw material transferred from the storage tank, to obtain molten glass.

In the molten glass producing apparatus according to the present disclosure, the absorption tank may include a first tank that causes the aqueous solution to absorb carbon dioxide gas, to obtain sodium carbonate;

a second tank that causes the aqueous solution transferred from the first tank to further absorb carbon dioxide gas, to obtain sodium hydrogen carbonate in the aqueous solution; and an internal pipe that transfers carbon dioxide gas remaining in the second tank to the first tank.

The molten glass producing apparatus according to the present disclosure may further include a heat supplier that supplies heat to the storage tank, to convert the sodium hydrogen carbonate into sodium carbonate in the storage tank, and to obtain carbon dioxide gas to be absorbed in the absorption tank.

In the molten glass producing apparatus according to the present disclosure, the heat supplier may include a heat supply tube that transfers an exhaust gas generated by combustion in the melting furnace with heat of the exhaust gas from the melting furnace to the storage tank.

In the molten glass producing apparatus according to the present disclosure, the heat supplier may include a hot air generator that generates hot air separately from the melting furnace, and blows the hot air into an interior of the storage tank.

The molten glass producing apparatus according to the present disclosure may further include a first gas pipe that transfers carbon dioxide gas in the storage tank from the storage tank to the absorption tank.

The molten glass producing apparatus according to the present disclosure may further include a second gas pipe that transfers carbon dioxide gas in the melting furnace from the melting furnace to the absorption tank.

The molten glass producing apparatus according to the present disclosure may further include a molder that granulates the mixed raw material, to obtain a briquette.

According to yet another aspect of the present disclosure, a glass article producing apparatus for producing a glass article includes the molten glass producing apparatus for producing molten glass;

a forming apparatus that forms the molten glass obtained in the melting furnace;

an annealing apparatus that anneals the glass formed by the forming apparatus; and a processing apparatus that processes the annealed glass into a glass article.

Effects of the Invention

According to one aspect of the present disclosure, in a process of producing molten glass, an amount of carbon dioxide gas generated can be reduced.

BRIEF DESCRIPTION OF DRAWINGS

Other objects and further features of the present disclosure will be apparent from the following detailed description when read in conjunction with the accompanying drawings, in which:

FIG. 6 is a diagram depicting an example of a relationship between a decarbonation ratio and a temperature of the mixed raw material;

DESCRIPTION OF THE PREFERRED EMBODIMENT

Figure 1:
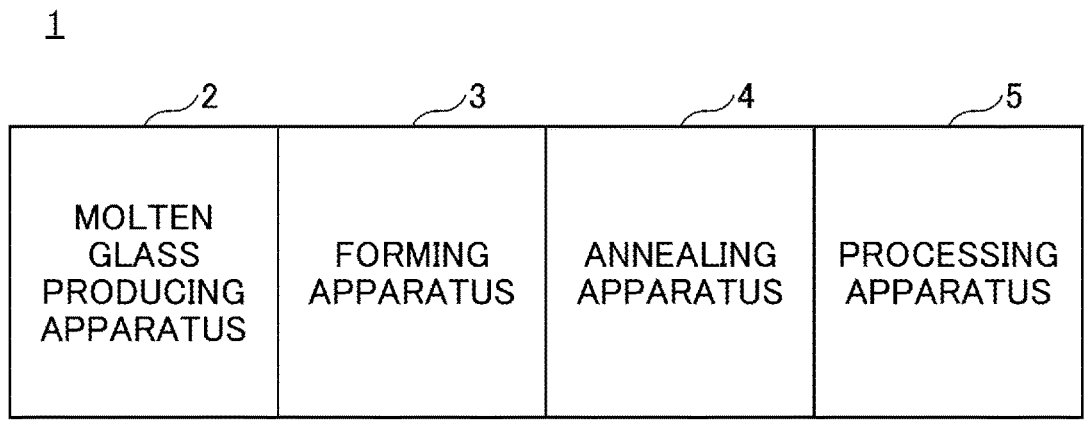
FIG. 1 is a diagram schematically illustrating an example of a glass article producing apparatus according to an embodiment.

Hereinafter, embodiments of the present disclosure will be described with reference to the drawings. In each drawing, to the same or corresponding configurations the same reference numeral will be assigned, and an explanation may be omitted.

(Apparatus for Producing Glass Article)

As shown in FIG. 1, a glass article producing apparatus 1 includes a molten glass producing apparatus 2, a forming apparatus 3, an annealing apparatus 4, and a processing apparatus 5.

The molten glass producing apparatus 2 melts a mixed raw material and produces molten glass. The mixed raw material includes a plurality of types of glass raw materials. The types of glass raw materials are determined according to composition of glass to be produced.

When the glass is soda lime glass, the composition of the glass is, in terms of mol % based on oxides, a content of $SiO_2$ of 50% or more and 75% or less; a content of $Al_2O_3$ of 0% or more and 20% or less; a total content of $Li_2O$, $Na_2O$, and $K_2O$ of 5% or more and 25% or less; and a total content of MgO, CaO, SrO, and BaO of 0% or more and 20% or less.

Where the glass is soda lime glass, the mixed raw material includes, for example, silica sand, dolomite ($MgCO_3.CaCO_3$), limestone ($CaCO_3$), sodium hydrogen carbonate ($NaHCO_3$), boric acid, a clarifying agent, and the like. The clarifying agent is sulfur trioxide, chloride, fluoride, or the like. Details of the mixed raw material will be described below.

In the molten glass producing apparatus 2, the mixed raw material is charged into a melting furnace. The mixed raw material is molten in the melting furnace, and molten glass is obtained. The mixed raw material may be granulated or not granulated prior to be charged into the melting furnace.

In the molten glass producing apparatus 2, the mixed raw material may be charged into the melting furnace with glass cullet. Glass cullet may be mixed into the mixed raw material prior to be charged into the melting furnace, or the glass cullet may be charged into the melting furnace separately from the mixed raw material. Details of the molten glass producing apparatus 2 will be described below.

The forming apparatus 3 forms the molten glass obtained in the molten glass producing apparatus 2 into a desired shape of glass. For example, a float process, a fusion process, or a roll-out process may be used to form a sheet of glass.

The annealing apparatus 4 slowly cools down the glass formed by the forming apparatus 3. The annealing apparatus 4 includes, for example, an annealing furnace and a conveying roller for conveying glass in a desired direction in the annealing furnace. A plurality of conveying rollers are arranged, for example, in the horizontal direction at intervals. The glass is slowly cooled as it is conveyed from an inlet to an outlet of the annealing furnace. By slowly cooling the glass, a glass with low residual strain is obtained.

The processing apparatus 5 processes the glass that is annealed by the annealing apparatus 4 into a glass article. The processing apparatus 5 may be one or more selected from, for example, a cutting apparatus, a grinding apparatus, a polishing apparatus, and a coating apparatus. The cutting apparatus cuts a glass article from the glass that is cooled down by the annealing apparatus 4. The cutting apparatus, for example, forms a scribe line on the glass annealed by the annealing apparatus 4, and cuts the glass along the scribe line.

The glass article producing apparatus 1 may further include a clarifying apparatus. The clarifying apparatus removes a bubble contained in the molten glass obtained by the molten glass producing apparatus 2 before being formed by the forming apparatus 3.

(Method for Producing of Glass Article)

Figure 2:
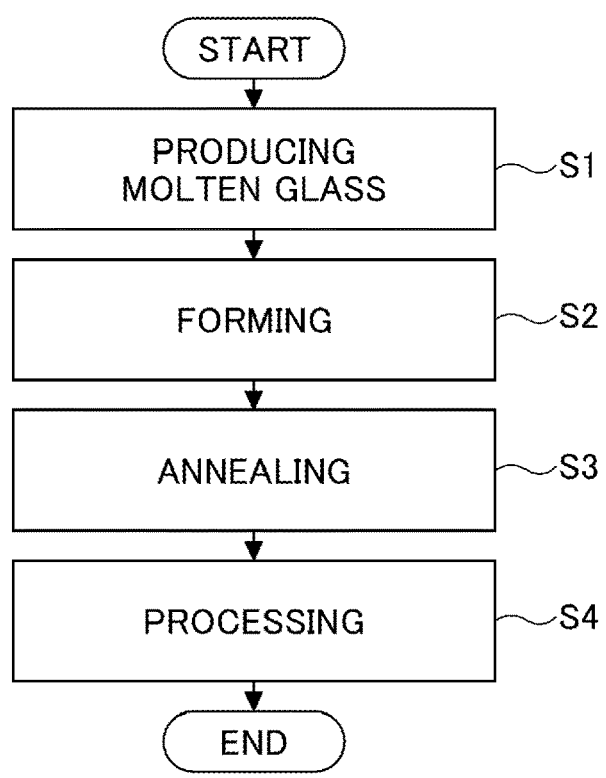
FIG. 2 is a flowchart depicting an example of a glass article producing method according to the embodiment.

As shown in FIG. 2, a method for producing a glass article includes producing molten glass (S1), forming (S2), annealing (S3), and processing (S4). The molten glass producing apparatus 2 performs the producing molten glass (S1), the forming apparatus 3 performs the forming (S2), the annealing apparatus 4 performs the annealing (S3), and the processing apparatus 5 performs the processing (S4). The method for producing a glass article may further include clarification. The clarification is performed after the producing molten glass (S1) and before the forming (S2).

(Molten Glass Producing Apparatus)

Figure 3:
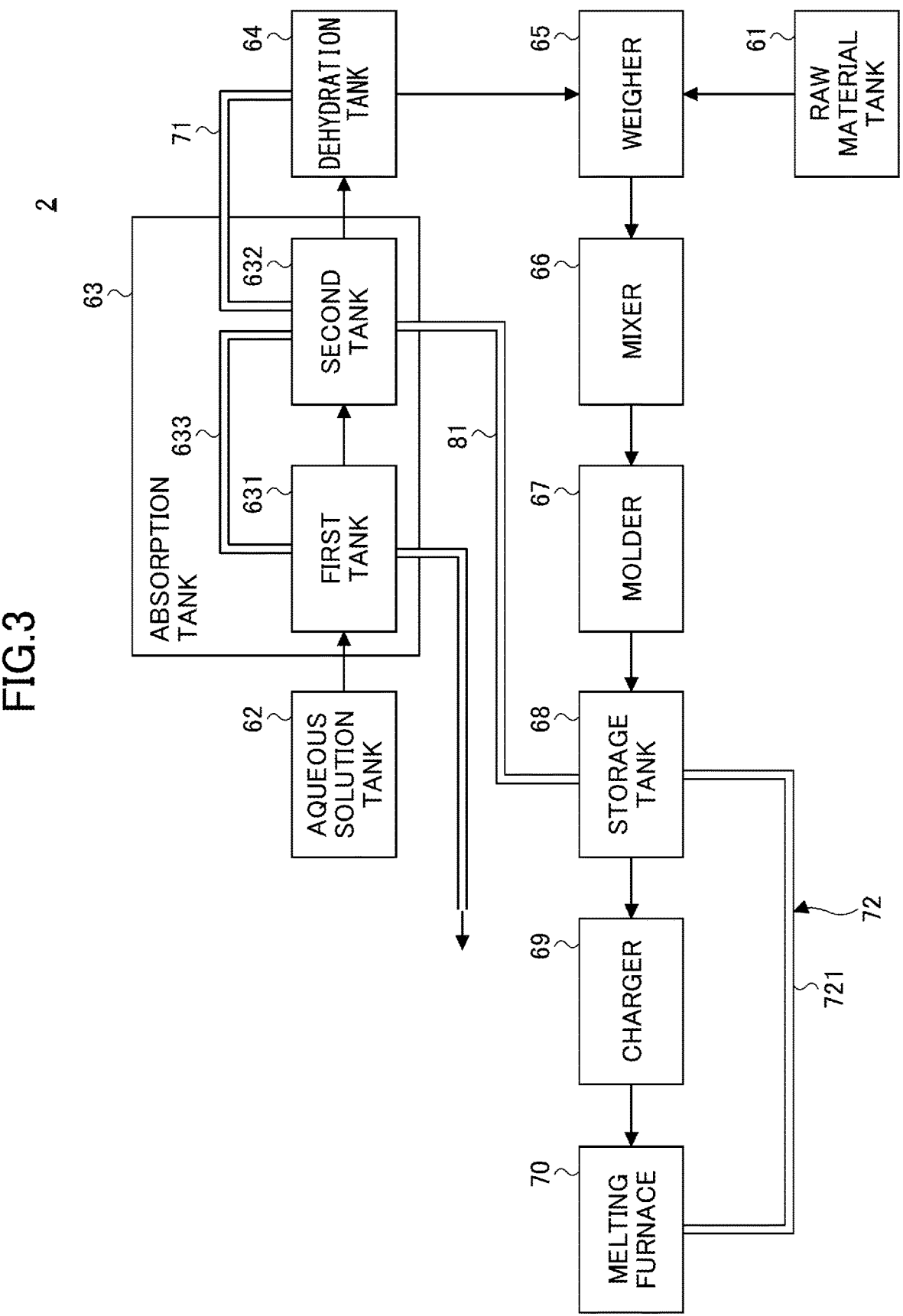
FIG. 3 is a diagram schematically illustrating an example of a molten glass producing apparatus according to the embodiment.

As shown in FIG. 3, the molten glass producing apparatus 2 includes a raw material tank 61, an aqueous solution tank 62, an absorption tank 63, a dehydration tank 64, a weigher 65, a mixer 66, a molder 67, a storage tank 68, a charger 69, and a melting furnace 70.

The raw material tank 61 stores glass raw materials other than an aqueous solution that is stored in the aqueous solution tank 62. The raw material tank 61 stores a powdered glass raw material. The raw material tank 61 stores, for example, a silicon source, or an alkaline earth metal source.

Silica or feldspar is prepared as a powdered silicon source. The silica may be any of silica sand, quartz, cristobalite, and amorphous silica. Two or more silicon sources may be prepared.

Carbonate is prepared in the embodiment as a powdered alkaline earth metal source. The alkaline earth metal refers to Mg, Ca, Ba, and Sr. As the carbonate, limestone ($CaCO_3$) or dolomite ($MgCO_3.CaCO_3$) is preferable, according to its inexpensive price. Two or more carbonates may be prepared.

In this embodiment, a carbonate is prepared as a powdered alkaline earth metal source, but an oxide or a hydroxide may be prepared. If an oxide or a hydroxide is prepared, carbon dioxide gas will not be generated during heating. An oxide is expensive because it is obtained by heating a carbonate. However, because an oxide does not contain carbon, an amount of carbon dioxide gas generated can be reduced. The same applies to hydroxides.

The raw material tank 61 may further store an aluminum source in addition to a silicon source and an alkaline earth metal source. As the aluminum source, for example, aluminum oxide, aluminum hydroxide, or feldspar is prepared. Two or more aluminum sources may be prepared.

The raw material tank 61 may further store a boron source, such as boric acid, a zirconium source, such as zirconia oxide, or a clarifying agent in addition to a silicon source and an alkaline earth metal source.

A plurality of types of powdered glass raw material are prepared to obtain a desired composition of glass. The plurality of types of glass raw material may be stored separately in the plurality of raw material tanks 61, or collectively in the single raw material tank 61.

The aqueous solution tank 62 stores an aqueous solution of sodium hydroxide (NaOH). As a typical NaOH aqueous solution, an aqueous solution with a concentration of 48 wt % NaOH is distributed. An aqueous solution with a NaOH concentration of 48 wt % has a freezing point of 10° C. and a boiling point of 138° C.

Because NaOH as the sodium source does not contain carbon, NaOH is not a carbon dioxide gas source. However, NaOH has a high vapor pressure and has strong corrosiveness against bricks of the melting furnace 70. Therefore, NaOH is changed to $NaHCO_3$ in the absorption tank 63 before being charged to the melting furnace 70.

In the absorption tank 63, carbon dioxide gas is absorbed in the aqueous solution transferred from the aqueous solution tank 62, and NaHCO₃ is deposited, so that a slurry containing NaHCO₃ is obtained. Carbon dioxide gas at a temperature lower than the boiling point of the aqueous solution is supplied to the absorption tank 63 so that the aqueous solution of the absorption tank 63 does not boil.

First, when carbon dioxide gas is absorbed into the aqueous solution, NaOH reacts with CO₂, and a reaction of formula (1) below occurs, and Na₂CO₃ is formed.

$$2NaOH + CO_2 \rightarrow Na_2CO_3 + H_2O \tag{1}$$

According to high solubility of Na₂CO₃, Na₂CO₃ dissolves in water with little precipitation. A solute in the aqueous solution changes from NaOH to NaOH and Na₂CO₃.

Subsequently, when carbon dioxide gas is further absorbed into the aqueous solution, Na₂CO₃, CO₂, and water react, a reaction of formula (2) below occurs, and NaHCO₃ is formed.

$$Na_2CO_3 + CO_2 + H_2O \rightarrow 2NaHCO_3 \tag{2}$$

Since the solubility of NaHCO₃ is less than that of Na₂CO₃, NaHCO₃ is selectively precipitated.

When NaHCO₃ is heated, NaHCO₃ decomposes into Na₂CO₃, CO₂, and H₂O, so that NaHCO₃ has weak corrosiveness against bricks of the melting furnace 70 to the same degree as Na₂CO₃ as the sodium source.

When NaHCO₃ is heated, a reaction of formula (3) below occurs, and Na₂CO₃, CO₂, and H₂O are formed.

$$2NaHCO_3 \rightarrow Na_2CO_3 + CO_2 + H_2O \tag{3}$$

The reaction of formula (3) above is a reverse reaction of the reaction of formula (2).

Furthermore, when Na₂CO₃ is heated with a glass raw material, for example, a reaction of formula (4) below occurs, and alkali silicate and CO₂ are generated.

$$Na_2CO_3 + SiO_2 \rightarrow Na_2O \cdot SiO_2 + CO_2 \tag{4}$$

As shown in above-described formulas (3) and (4), carbon dioxide gas is generated in the process of obtaining alkali silicate from NaHCO₃. However, an amount of the generated carbon dioxide gas is equal to an amount of carbon dioxide gas absorbed in the aqueous solution in the absorption tank 63. Accordingly, in the entire process of producing molten glass, an amount of carbon dioxide gas derived from the sodium source is zero.

As described above, according to the present embodiment, because NaOH is used as the sodium source, the amount of carbon dioxide gas generated in the process of producing molten glass can be reduced. NaOH does not contain carbon, so that NaOH is not a source of generating carbon dioxide gas.

For example, when the Na₂O content of glass is 14 wt %, and a ratio of mixed raw materials to glass cullet is 3:1, by using NaOH instead of Na₂CO₃ as the sodium source, an amount of generated carbon dioxide gas per ton of glass is estimated to be reduced by about 0.075 tons.

Further, according to the present embodiment, NaOH is changed to NaHCO₃ in the absorption tank 63 prior to being charged to the melting furnace 70, so that erosion of the brick of the melting furnace 70 can be prevented. Therefore, a frequency of maintenance of the melting furnace 70 can be reduced.

In the present embodiment, all of the sodium source is an aqueous NaOH solution, but a part of the sodium source may be a powdered sodium carbonate (Na₂CO₃). Powdered Na₂CO₃ is stored in the raw material tank 61. As long as at least a portion of the sodium source is an aqueous NaOH solution, the amount of carbon dioxide gas generated from the sodium source can be reduced.

The absorption tank 63 includes, for example, a first tank 631, a second tank 632, and an internal pipe 633, as shown in FIG. 3. In the first tank 631, carbon dioxide gas is absorbed into the NaOH aqueous solution, and Na₂CO₃ is obtained. In the first tank 631, a mixed aqueous solution of NaOH and Na₂CO₃ is obtained.

In the second tank 632, carbon dioxide gas is further absorbed in the mixed aqueous solution of NaOH and Na₂CO₃ transferred from the first tank 631, and NaHCO₃ is precipitated. In the second tank 632, a slurry containing NaHCO₃ is obtained. The slurry contains Na₂CO₃ and NaHCO₃ as components dissolved in water.

The reaction of formula (1) occurs mainly in the first tank 631 and the reaction of formula (2) occurs mainly in the second tank 632. Because the reaction of formula (2) occurs after the reaction of formula (1), the reaction of formula (2) requires a higher concentration of carbon dioxide gas than that in the reaction of formula (1).

Then, the internal pipe 633 transfers the excess carbon dioxide gas in the second tank 632 to the first tank 631. The concentration of carbon dioxide gas supplied to the first tank 631 is lower than the concentration of carbon dioxide gas supplied to the second tank 632. In other words, the concentration of carbon dioxide gas supplied to the second tank 632 is higher than the concentration of carbon dioxide gas supplied to the first tank 631. According to the present embodiment, since to the first tank 631 and the second tank 632 gases having concentrations of carbon dioxide gas according to the respective requirements are supplied, carbon dioxide gas can be efficiently used in the molten glass producing apparatus 2.

In this embodiment, the concentration of the carbon dioxide gas supplied to the second tank 632 is higher than the concentration of the carbon dioxide gas supplied to the first tank 631, but the concentration may be the same as or lower than that of the carbon dioxide gas supplied to the first tank 631. The reaction of formula (1) may occur mainly in the first tank 631, and the reaction of formula (2) may occur mainly in the second tank 632.

The reaction of formula (2) may also occur in the first tank 631, as long as the reaction of formula (1) mainly occurs in the first tank 631. The absorption tank 63 includes the first tank 631 and the second tank 632 in the present embodiment. However, the absorption tank 63 may be provided with a single tank that serves as both the first tank 631 and the second tank 632. Since precipitation occurs in the second tank 632, a temperature in the second tank is preferably low.

The dehydration tank 64 dehydrates the slurry transferred from the absorption tank 63. The slurry includes a precipitated powder of NaHCO₃ and a liquid which is a dispersion medium for NaHCO₃. The liquid contains Na₂CO₃ that is not precipitated and NaHCO₃.

The dehydration tank 64 separates the liquid from the slurry. Separation methods include, for example, a centrifugation separation method and a filtration separation method. Because the liquid separated from the slurry contains the non-precipitated Na₂CO₃ and NaHCO₃, the liquid is returned to the absorption tank 63 through a sodium collection pipe 71. An amount of used aqueous NaOH solution, which is the source of sodium, can be reduced compared to discarding the liquid.

The sodium collection pipe 71 may return the liquid separated from the slurry in the dehydration tank 64 to the first tank 631, but in this embodiment returns the liquid to the second tank 632. The liquid separated from the slurry is saturated with NaHCO₃. Since the liquid with high NaHCO₃ concentration is returned to the second tank 632, the reaction of formula (2) proceeds efficiently in the second tank 632.

In the dehydration tank 64, a sludge substance of precipitated NaHCO₃ and a small amount of liquid is retained. The percentage of NaHCO₃ in the sludge substance is, for example, from 85 wt % to 95 wt %, and the percentage of the liquid in the sludge substance is, for example, from 5 wt % to 15 wt %.

The sludge substance obtained in the dehydration tank 64 may be transferred to the weigher 65 via a dryer which removes the liquid from the sludge substance. However, in the present embodiment, the sludge substance is transferred to the weigher 65 without removing the liquid by the dryer. The precipitated NaHCO₃ is transferred to the weigher 65 while mixed with the liquid.

The weigher 65 weighs the glass raw material moved from the raw material tank 61 and the NaHCO₃ moved from the dehydration tank 64 in a predetermined compounding ratio. The compounding ratio is determined in advance so that a desired composition of glass is obtained.

When the weigher 65 weighs the sludge substance, the compounding ratio is determined by considering also the content of the liquid in the sludge substance. In addition, the compounding ratio may be determined by considering also the Na content of the liquid.

There may be a storage tank for storing the sludge substance between the dehydration tank 64 and weigher 65.

The mixer 66 mixes the glass raw material moved from the raw material tank 61 via the weigher 65 and the NaHCO₃ moved from the absorption tank 63 via the weigher 65, to obtain the mixed raw material. Water is added during mixing to prevent dust scattering.

According to the present embodiment, the sludge substance obtained in the dehydration tank 64 moves to the mixer 66 without going through the dryer. Then, a liquid in the sludge substance suppresses the dust scattering. Therefore, it is possible to reduce an amount of water or the like to be sprayed in the dehydration tank 64.

The molder 67 granulates the mixed raw material obtained in the mixer 66, to obtain a briquette. Briquettes are made by compression molding of the mixed raw material in the powder form. A molding aid may be added to the mixed raw material. The briquette may have a spherical shape, a cylindrical shape, a rectangular parallelepiped shape, an elliptical shape, an almond-shape, or the like. In the present embodiment, a known molder 67, such as a tableting machine or a roll-type compression granulator, is used.

The storage tank 68 stores the mixed raw materials moved from the mixer 66 via the molder 67. That is, the storage tank 68 stores briquettes. The storage tank 68 may store the mixed raw material moved from the mixer 66 without granulating the mixed raw material by the molder 67. That is, the storage tank 68 may store the mixed raw materials in a powder form.

The charger 69 charges the mixed raw material transferred from the storage tank 68 into the melting furnace 70. In the embodiment, as the charger 69, a known device is used.

Figure 4:
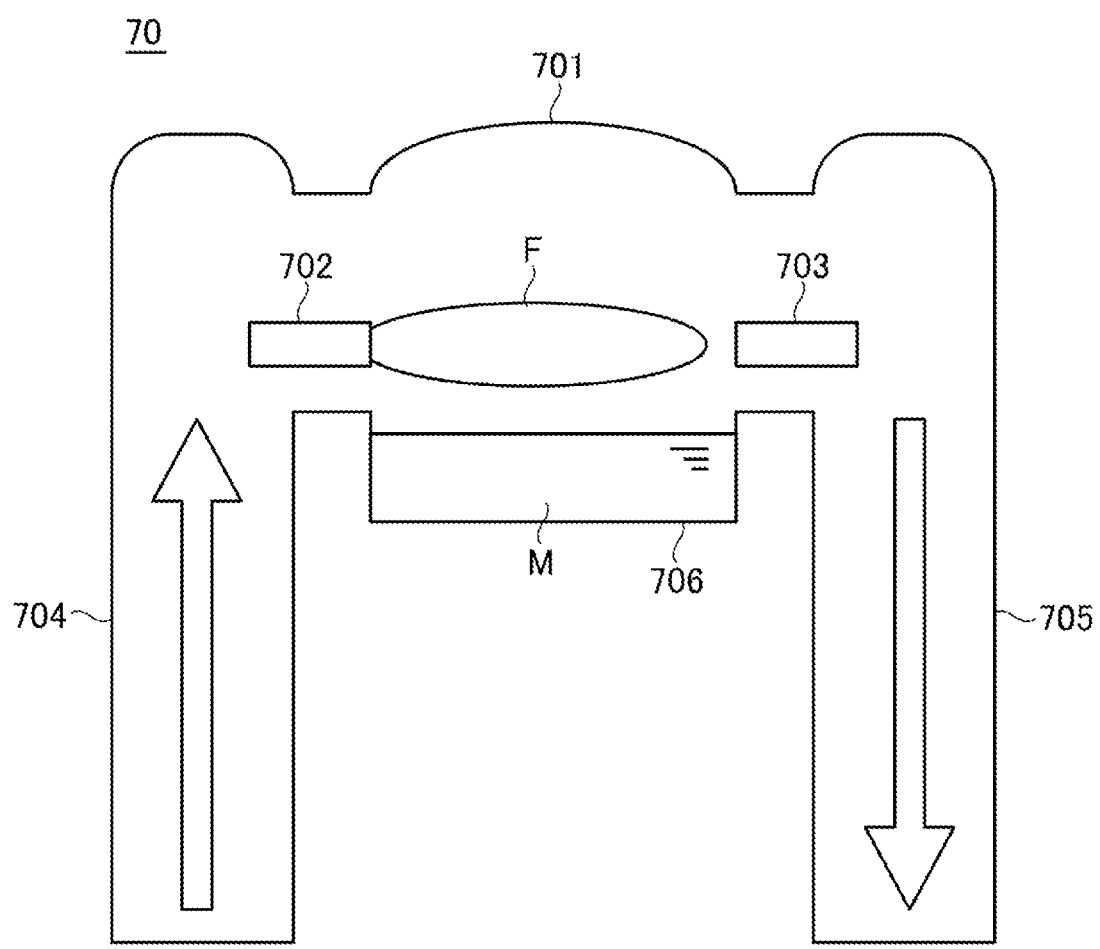
FIG. 4 is an elevational cross-sectional view schematically illustrating an example of the melting furnace in FIG. 3.

The melting furnace 70 melts the mixed raw material transferred from the storage tank 68, to provide molten glass. The melting furnace 70 is not particularly limited, and includes, for example, as shown in FIG. 4, a combustion furnace 701, a first burner 702, a second burner 703, a first heat storage chamber 704, and a second heat storage chamber 705.

The combustion furnace 701 includes a melting tank 706 storing molten glass M. The mixed raw material is charged to a liquid level of the molten glass M from above.

The first burner 702 and the second burner 703 are disposed interposing the combustion furnace 701 in between, and alternately form a flame in the combustion furnaces 701. The flame F is formed above the liquid level of the molten glass M. The mixed raw material and the molten glass M are heated by radiant heat of the flame F.

The first burner 702 mixes a fuel and a gas, and burns the mixture, to form the flame F. The fuel may be heavy oil, but in the present embodiment the fuel is natural gas. The gas may be oxygen gas, but in this embodiment the gas is air. In the specification of the present application, the oxygen gas means a gas having an oxygen concentration of 90 vol % or more. The second burner 703 also forms a flame F similarly to the first burner 702.

The first heat storage chamber 704 and the second heat storage chamber 705 are disposed interposing the combustion furnace 701 in between, to collect and store heat of the exhaust gas from the combustion furnace 701. The stored heat is used for heating a combustion gas such as air. The first heat storage chamber 704 is arranged so as to face the second burner 703, and the second heat storage chamber 705 is arranged so as to face the first burner 702.

For example, as shown in FIG. 4, when the first burner 702 forms the flame F, the first heat storage chamber 704 radiates the stored heat, to heat a combustion gas such as air. In this case, the second heat storage chamber 705 collects and stores heat of the exhaust gas from the combustion furnace 701.

Similarly, when the second burner 703 forms the flame F, the second heat storage chamber 705 radiates the stored heat, to heat a combustion gas such as air. In this case, the first heat storage chamber 704 collects and stores heat of the exhaust gas from the combustion furnace 701.

Figure 5A:
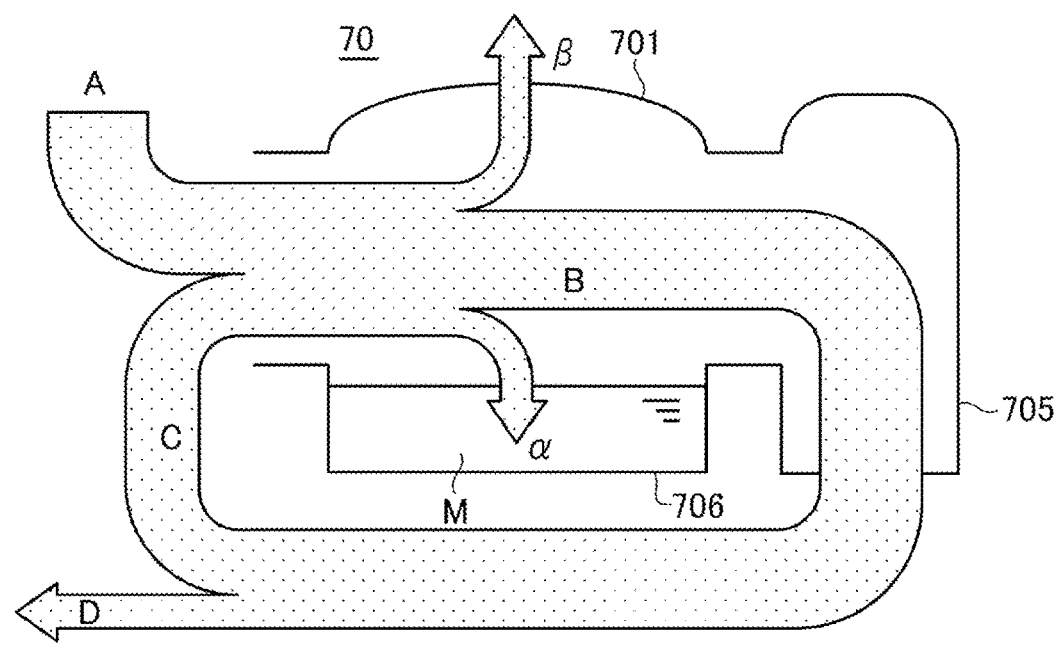
FIG. 5A is a diagram schematically illustrating an example of a heat balance in the melting furnace shown in FIG. 4 in the case where the heat supply tube shown in FIG. 3 is absent.

FIG. 5A shows an example of a heat balance in the melting furnace 70 shown in FIG. 4 in the case where the heat supply tube 721 shown in FIG. 3 is absent. Symbols A, B, C, D, $\alpha$, and $\beta$ in FIG. 5A indicate amounts of heat in the melting furnace 70, as follows: an amount of heat generated by the combustion of the fuel is indicated by A. An amount of heat transferred from the combustion furnace 701 to the first heat storage chamber 704 and the second heat storage chamber 705 by the exhaust gas is indicated by B. An amount of heat heating the combustion gas such as air, before being mixed into the fuel, in the first heat storage chamber 704 and the second heat storage chamber 705 is indicated by C. An amount of heat transferred from the first heat storage chamber 704 and the second heat storage chamber 705 to the exterior of the molten glass producing apparatus 2 by the exhaust gas is indicated by D. A sum of an amount of heat consumed in the process of melting the mixed raw material and an amount of heat transferred from the melting furnace 70 to the forming apparatus 3 by the molten glass M is indicated by a. The larger a ratio of a to A, i.e., $\alpha/A$, the better the heating efficiency. An amount of heat passing through walls or the like of the melting furnace 70 and escaping from the melting furnace 70 is indicated by $\beta$. A sum of A and C is equal to a sum of $\alpha$, $\beta$ and B. A sum of C and D is equal to B. Furthermore, the symbols A, B, C, D, $\alpha$ and $\beta$ indicate amounts of heat per ton of glass.

Figure 5B:
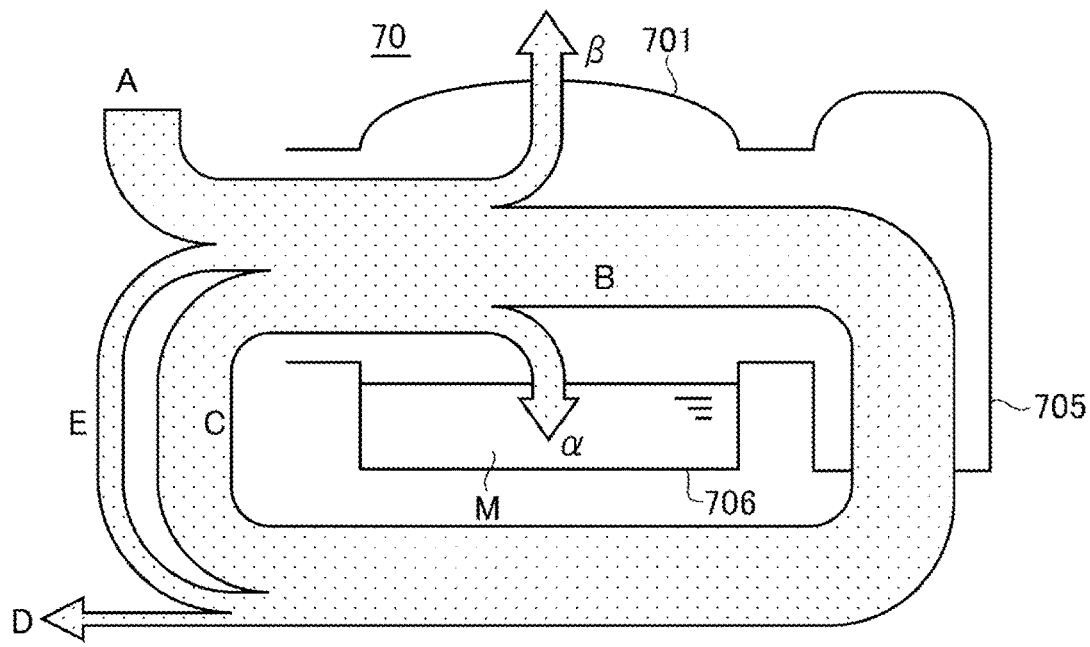
FIG. 5B is a diagram schematically illustrating an example of a heat balance in the melting furnace shown in FIG. 4 in the case where the heat supply tube shown in FIG. 3 is present.

FIG. 5B shows an example of the heat balance in the melting furnace 70 shown in FIG. 4 in the case where the heat supply tube 721 shown in FIG. 3 is present. The heat supply tube 721 shown in FIG. 3 is an example of a heat supplier 72. The heat supplier 72 supplies heat to the interior of the storage tank 68. The heat supply tube 721 moves exhaust gas generated by combustion in the melting furnace 70 from the melting furnace 70 to the storage tank 68 with the heat of the exhaust gas. For example, the heat supply tube 721 moves the exhaust gas from the first heat storage chamber 704 and the second heat storage chamber 705 with the heat of the exhaust gas from the melting furnace 70 to the storage tank 68. The mixed raw material is heated in the storage tank 68, and then charged into the melting furnace 70 without being cooled to the normal temperature. Thus, residual heat of the exhaust gas can be used effectively.

The meanings of the symbols A, B, C, D, $\alpha$, and $\beta$ in FIG. 5B are the same as those of the symbols A, B, C, D, $\alpha$, and $\beta$ in FIG. 5A. In FIG. 5B, an amount of heat transferred by the mixed raw material heated in the storage tank 68 from the storage tank 68 to the melting furnace 70 is indicated by E. As well as A, B, C, D, $\alpha$, and $\beta$, the symbol E indicates an amount of heat per ton of glass. A sum of A, C, and E is equal to a sum of $\alpha$, $\beta$, and B. Also, B is equal to a sum of C, D, and E.

According to the present embodiment, the mixed raw material is heated by the residual heat of the exhaust gas in the storage tank 68, as described above, and then charged into the melting furnace 70 without cooling to the normal temperature. As a result, as shown in FIG. 5B, D decreases and E appears, so that A decreases.

The reduction amount A is greater than the amount E, e.g., 1.5 to 2 times the amount of E. This is because only a part of the amount A is absorbed in the mixed raw material, whereas the entire amount E is absorbed in the mixed raw material. As the amount A is greatly reduced, fuel consumption will be reduced and the amount of generated carbon dioxide gas will be greatly reduced.

For example, if a mixed raw material at a temperature of 500° C. is charged into the melting furnace 70 instead of a mixed raw material at a temperature of 20° C., the amount A would be estimated to be reduced by from 0.9 GJ to 1.2 GJ, and the amount of generated carbon dioxide gas per ton of glass would be reduced by from 0.045 to 0.06 tons. In the above-described estimation, the amount of generated carbon dioxide gas is assumed to be 0.05 tons per GJ of combustion heat.

Since the mixed raw material contains $NaHCO_3$ or the like, when heated, carbon dioxide gas is generated, as shown in FIG. 6. In FIG. 6, the horizontal axis is the temperature and the vertical axis is a decarbonation ratio. The decarbonation ratio is a ratio of an amount of carbon dioxide gas actually separated from the mixed raw material to a total amount of carbon dioxide gas to be separated from the mixed raw material in the process of increasing the temperature of the mixed raw material from the normal temperature to the melting temperature.

During the rise of the temperature of the mixed raw material from the normal temperature to 300° C., the reaction of formula (3) occurs and $NaHCO_3$ decomposes into $Na_2CO_3$, $CO_2$, and $H_2O$. Thereafter, when the temperature of the mixed raw material exceeds 400° C., the reaction of formula (4) and the like occur, and carbonates such as $Na_2CO_3$, $CaCO_3$, $MgCO_3$ decompose, and carbon dioxide gas is generated.

The heat supplier 72 supplies heat to the storage tank 68. In the storage tank 68, the mixed raw material is heated to the extent that the flowability of the mixed raw material is not impaired. In the storage tank 68, the heating of the mixed raw material is, for example, at the temperature of from 100° C. to 900° C., and preferably from 300° C. to 800° C.

When the mixed raw material is granulated in advance, the flowability of the mixed raw material is not impaired if the temperature of the mixed raw material is 800° C. or lower. When the mixed raw material is granulated in advance and mixed with cullet for use, the flowability of the mixed raw material is not impaired if the temperature of the mixed raw material is 500° C. or lower. If the mixed raw material is not granulated in advance, the flowability of the mixed raw material is not impaired if the temperature of the mixed raw material is 500° C. or lower.

The heat supply tube 721 transfers the exhaust gas generated in the combustion in the melting furnace 70 from the melting furnace 70 to the storage tank 68 with the heat of the exhaust gas. For example, at the outlet of the first heat storage chamber 704 or the second heat storage chamber 705, the temperature of the exhaust gas is about 500° C. In the storage tank 68, the mixed raw material is heated to 300° C. or higher.

The mixed raw material is heated to 300° C. or higher in the storage tank 68, and the reaction of formula (3) proceeds in the storage tank 68 to produce carbon dioxide gas. Thereafter, the mixed raw material is heated to 1000° C. or higher in the melting furnace 70, and the reaction of formula (4) proceeds in the melting furnace 70, to produce carbon dioxide gas.

The carbon dioxide gas produced in the reaction of formula (4) passes through the heat supply tube 721 and moves from the melting furnace 70 to the storage tank 68. The heat supply tube 721 also has the function of transferring the carbon dioxide gas in the melting furnace 70 from the melting furnace 70 to the storage tank 68.

In the storage tank 68, the carbon dioxide gas produced in the reaction of formula (4) is merged with the carbon dioxide gas produced in the reaction of formula (3). The merged carbon dioxide gas passes through a first gas line 81 and moves from the storage tank 68 to the absorption tank 63. In the absorption tank 63, carbon dioxide gas equivalent to carbon dioxide gas separated from $NaHCO_3$ is absorbed in the aqueous NaOH solution.

The first gas line 81 transfers carbon dioxide gas in the storage tank 68 from the storage tank 68 to the absorption tank 63. In the process, the carbon dioxide gas is cooled by heat dissipation, dilution, or the like to a temperature below the boiling point of the aqueous solution of the absorption tank 63. At the inlet of the absorption tank 63, the temperature of the carbon dioxide gas is, for example, from 50° C. to 90° C.

When the mixed raw material is granulated in advance and mixed with cullet, if the temperature of the exhaust gas is 500° C. or higher at the inlet of the storage tank 68 and is from 100° C. to 300° C. at the outlet, the temperature of the granulated mixed raw material and cullet is about 500° C. and it is preferable.

The exhaust gas is preferably introduced to the absorption tank 63 at a temperature of 100° C. or higher when the exhaust gas contains water vapor, or at the acid dew point or higher when it contains acid gas such as $SO_2$.

A condenser may be disposed on the first gas line 81 near the absorption tank 63 to remove water and acid gas from the exhaust gas. Thus, the temperature of the exhaust gas can be decreased and the $CO_2$ concentration can be increased.

The first gas line 81 transfers the carbon dioxide gas in the storage tank 68 from the storage tank 68 to the absorption tank 63, and transfers a portion of the heat of carbon dioxide gas in the storage tank 68 to the absorption tank 63. Thus, the power consumption of a heater for heating an aqueous solution in the absorption tank 63 can be reduced. The temperature of the aqueous solution of the absorption tank 63 is adjusted to, for example, from 30° C. to 90° C. to efficiently proceed with the reactions of formula (1) and formula (2).

(First Variation)

In the embodiment described above, the melting furnace 70 includes the first heat storage chamber 704 and the second heat storage chamber 705. The first heat storage chamber 704 and the second heat storage chamber 705 are typically utilized when the combustion gas is air. Most of the air is nitrogen, and nitrogen does not contribute to combustion. Therefore, a large amount of air is consumed and a large amount of exhaust gas is generated. A first heat storage chamber 704 and a second heat storage chamber 705 are used to collect heat from the large amount of exhaust gas. The number of heat storage chambers is not limited to two, but may be one or greater than or equal to three.

If the combustion gas is oxygen gas, the first heat storage chamber 704 and the second heat storage chamber 705 may be used, but are not generally used. If the combustion gas is oxygen gas, the heat storage chamber is often not used because of the small amount of exhaust gas and a high construction cost of the heat storage chamber. If the combustion gas is air, as described above, a heat storage chamber is generally used, but may not be used.

In this variation, the melting furnace 70 is not provided with a heat storage chamber. Hereinafter, the difference between the present variation and the above-described embodiment will be mainly described. The producing apparatus 2 according to the present variation is the same as the producing apparatus 2 according to FIG. 3, and is not shown in the drawing.

The heat supply tube 721 transfers the exhaust gas generated by combustion in the melting furnace 70 from the melting furnace 70 to the storage tank 68 with heat of the exhaust gas. According to the present variation, since the melting furnace 70 is not provided with a heat storage chamber, high temperature exhaust gas enters the storage tank 68 from the combustion furnace 701. The mixed raw material is heated to a high temperature by the residual heat of the exhaust gas in the storage tank 68, and is charged to the melting furnace 70 at a high temperature without being cooled to the normal temperature. However, if the exhaust gas is too hot, the temperature may be lowered by dilution.

Figure 7:
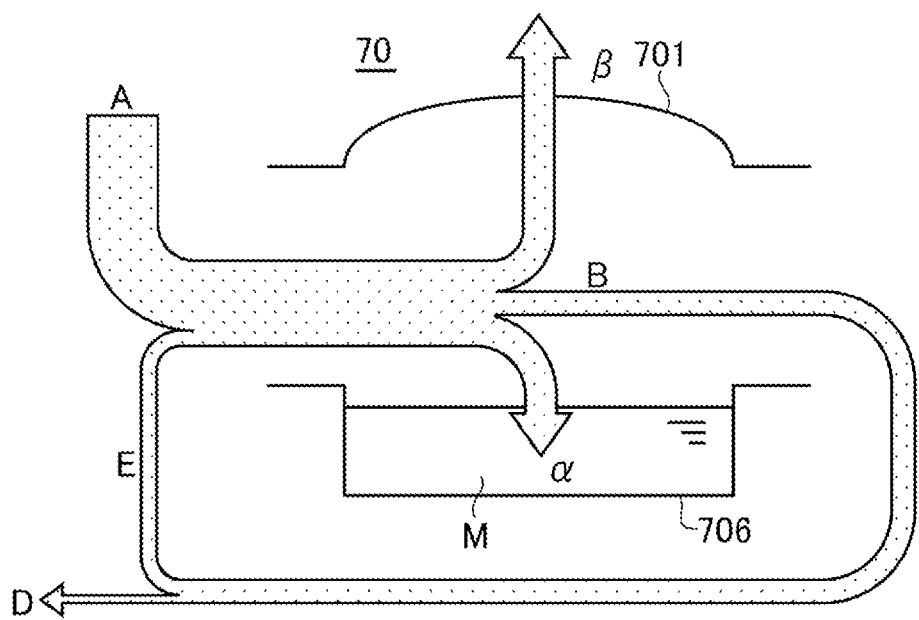
FIG. 7 is a diagram schematically illustrating an example of a heat balance in the melting furnace according to the first variation of the embodiment.

FIG. 7 shows a heat balance in the melting furnace 70 according to the present variation. The meanings of the symbols A, B, D, E, $\alpha$, and $\beta$ in FIG. 7 are the same as those of the symbols A, B, D, E, $\alpha$, and $\beta$ in FIG. 5B. According to the present variation, an amount of heat indicated by C shown in FIG. 5B is not present. A higher temperature exhaust gas can be used to preheat the mixing raw material at a higher temperature, thereby increasing the amount of heat E. A sum of A and E is equal to a sum of $\alpha$, $\beta$ and B. Moreover, B is equal to a sum of D and E.

According to the present variation, the amount of heat A is further reduced because the amount of heat E is increased. The fuel consumption is further reduced and the carbon dioxide gas emissions are further reduced. For example, if the mixed raw material at 800° C. is charged into the melting furnace 70 instead of the mixed raw material at 20° C., the amount of heat A is reduced by from 1.7 GJ to 2.0 GJ and the amount of carbon dioxide gas produced is estimated to be reduced by from 0.085 tons to 0.1 tons less per ton of glass. This estimate assumes generation of 0.05 tons of carbon dioxide gas per 1 GJ of heat of combustion.

The mixed raw material is heated to a high temperature in the storage tank 68. The maximum heating temperature is about 800° C. Thus, the mixed raw material is granulated in the molder 67 before being transferred to the storage tank 68. Different from the powdered mixed raw material, the briquette obtained by granulation is heated to about 800° C. without impairing fluidity. This is because a melt that is generated early in the heating is retained within the briquette, which suppresses adhesion of the briquettes to each other. When glass cullet is charged into the melting furnace 70 as well as the mixed raw material, glass cullet is charged into melting furnace 70 separately from the mixed raw material so as not to impair the fluidity of the mixed raw material.

Between the briquettes, a larger space is formed than that between the powdered mixed raw materials. This space can be used as a passageway for the exhaust gas. Therefore, the briquettes can efficiently absorb the heat of the exhaust gas. This effect is also obtained when the melting furnace 70 has a heat storage chamber. Instead of the above-described direct heat exchange, an indirect heat exchange may be performed in which the heat of the exhaust gas is indirectly transferred to the mixed raw material without direct contact between the mixed raw material and the exhaust gas. In the case of the indirect heat exchange, powdered mixed raw material can also be used.

(Second Variation)

In the embodiment and the first variation, the heat supplier 72 includes the heat supply tube 721. The heat supply tube 721 transfers the exhaust gas generated by combustion in the melting furnace 70 from the melting furnace 70 to the storage tank 68 with the heat of the exhaust gas. The heat supply tube 721 transfers not only the heat of the exhaust gas but also the carbon dioxide gas of the exhaust gas from the melting furnace 70 to the storage tank 68.

Figure 8:
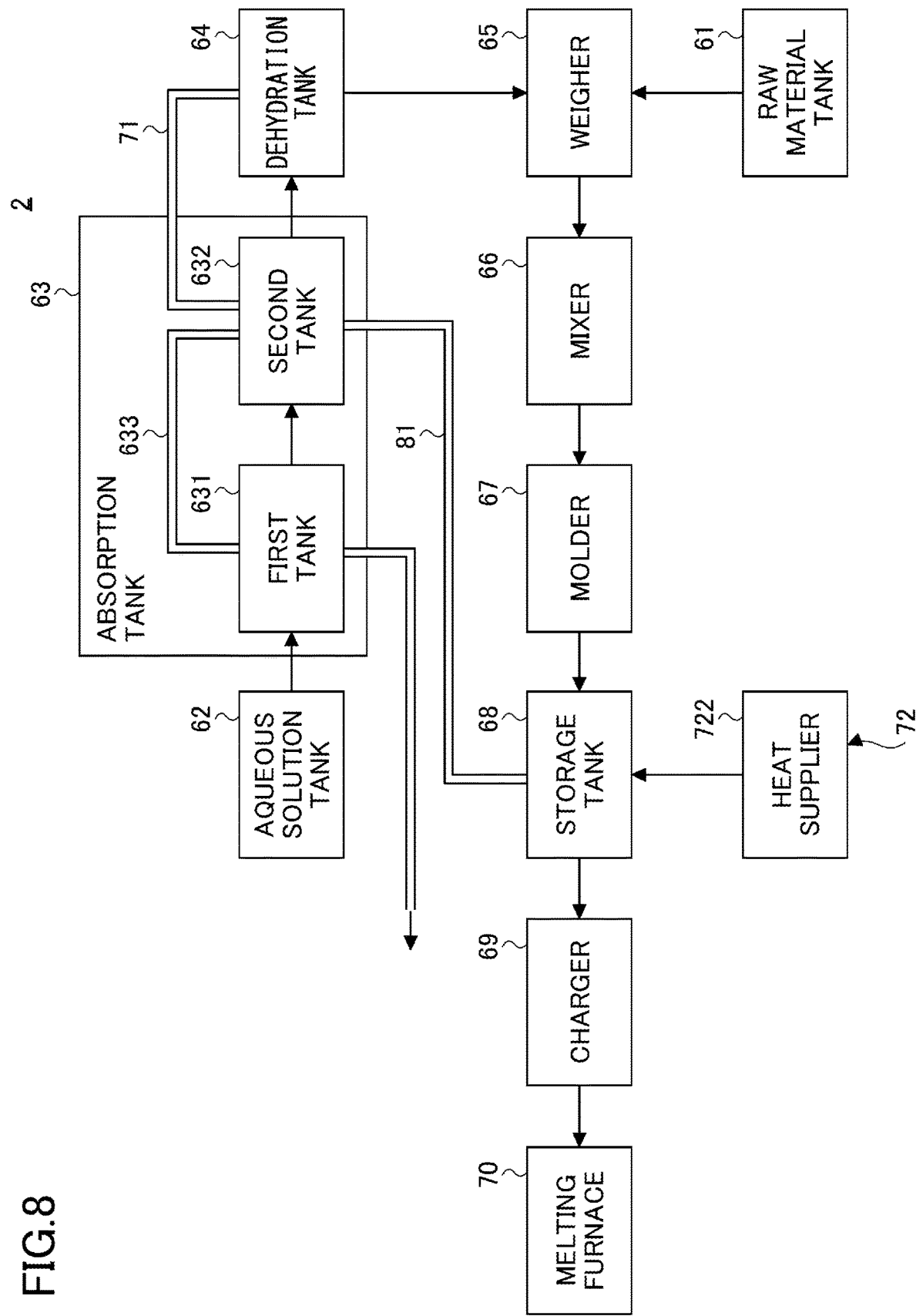
FIG. 8 is a diagram depicting an example of a molten glass producing apparatus according to a second variation of the embodiment.

In the present variation, as shown in FIG. 8, the heat supplier 72 includes a hot air generator 722. The hot air generator 722 generates hot air separately from the melting furnace 70 and blows the air to the storage tank 68. Hereinafter, a difference between the present variation and the above-described embodiment will be mainly described.

In the present variation, the hot air generator 722 is used instead of the heat supply tube 721. The hot air generator 722 includes, for example, a heat line that generates heat by electric power and a fan that sends air toward the heat line. Different from the exhaust gas, air contains little carbon dioxide gas.

The mixed raw material is pyrolyzed by heat of the hot air in the storage tank 68, to produce carbon dioxide gas. The generated carbon dioxide gas passes through the first gas line 81, moves from the storage tank 68 to the absorption tank 63, and is absorbed into the aqueous NaOH solution in the absorption tank 63.

In the absorption tank 63, the reaction of formula (1) and the reaction of formula (2) occur and carbon dioxide gas is absorbed. The temperature of the hot air is adjusted so that carbon dioxide gas in excess of the absorbed amount is generated by the pyrolysis of the mixed raw material. This is because the heat supply tube 721 is not present and carbon dioxide gas in the exhaust gas does not move from the melting furnace 70 to the storage tank 68.

As shown in FIG. 6, the reaction of formula (3) occurs while the temperature of the mixed raw material rises from the normal temperature to 300° C. The reaction of formula (3) is a reverse reaction of the reaction of formula (2). Accordingly, the amount of carbon dioxide gas required for the reaction of formula (2) is obtained by heating to 300° C.

The amount of carbon dioxide gas required for the remaining reaction of formula (1) is equal to the amount of carbon dioxide gas required for the reaction of formula (2). In the example shown in FIG. 6, the amount of carbon dioxide gas required for the absorption tank 63 is obtained while the temperature of the mixed raw material rises from the normal temperature to 800° C.

The mixed raw material is heated to about 800° C. in the storage tank 68 in the same manner as the first variation described above. Thereafter, the mixed raw material is charged to the melting furnace 70 at a high temperature without being cooled to the normal temperature. Therefore, in the same manner as the above-described first variation, it is possible to reduce the amount of carbon dioxide gas generated due to combustion of fuel.

In the present embodiment, since the heat supply tube 721 is not present, not only heat of the exhaust gas but also carbon dioxide gas in the exhaust gas is not transferred from the melting furnace 70 to the storage tank 68. In this case, the melting furnace 70 may include an electric furnace in place of the combustion furnace 701. The electric furnace uses electricity and does not use fuel such as natural gas. Therefore, it is possible to suppress the generation of carbon dioxide gas due to the combustion of fuel.

However, if the melting furnace 70 has the electric furnace in place of the combustion furnace 701, the heat supply tube 721 may be present. The heat supply tube 721 can transfer the heat of the exhaust gas from the melting furnace 70 to the storage tank 68. The mixed raw material may be pyrolyzed by the heat of the exhaust gas.

In the above-described embodiment and the above-described first variation, the heat supply tube 721 is used alone. In the present variation, the hot air generator 722 is used alone. However, the heat supply tube 721 and the hot air generator 722 may be used in combination. The mixed raw material is pyrolyzed by the heat of the exhaust gas from the melting furnace 70 and the heat of the hot air from the hot air generator 722.

The hot air generator 722 of the present variation includes the heat line that generates heat by electric power and the fan that sends air toward the heat line. However, the technique of the present disclosure is not limited to this. For example, the hot air generator 722 may include a burner that injects fuel and gas to form a flame. The combustion of carbon-containing fuels generates carbon dioxide gas, and the temperature of the hot air may be low. The temperature of the hot air is adjusted to generate the required amount of carbon dioxide gas in the pyrolysis of the mixed raw material and the combustion of the fuel. When fuel containing hydrogen or ammonia is burned, an increase in $CO_2$ can be suppressed because the fuel does not contain carbon.

(Third Variation)

In the above-described embodiment, the first variation, and the second variation, the producing apparatus 2 includes the heat supplier 72. The heat supplier 72 supplies heat to the storage tank 68. The mixed raw material is heated in the storage tank 68, and then charged to the melting furnace 70 at high temperature without being cooled to the normal temperature. The amount of fuel consumed is reduced, and the amount of carbon dioxide gas generated by combustion of the fuel is reduced.

Figure 9:
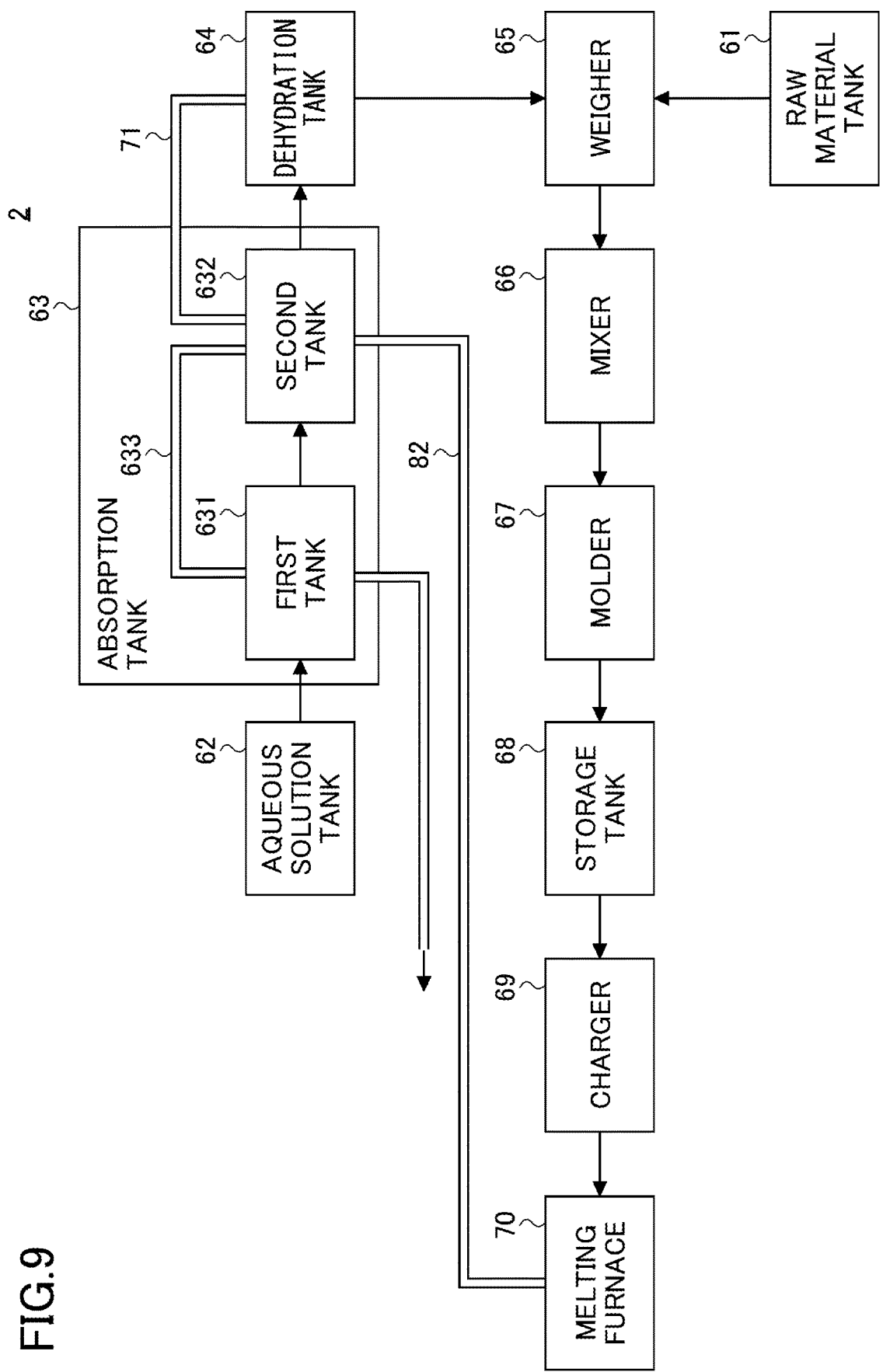
FIG. 9 is a diagram depicting an example of a molten glass producing apparatus according to a third variation of the embodiment.

As shown in FIG. 9, the producing apparatus 2 according to the present variation does not include the heat supplier 72. The mixed raw material is charged directly into the melting furnace 70 without being heated in the storage tank 68. The reaction of formula (3) and the reaction of formula (4) occur in the melting furnace 70. Hereinafter, a difference between the present variation and the above-described embodiment will be mainly described.

In the present variation, the pyrolysis of the mixed raw material does not proceed and carbon dioxide gas is not generated in the storage tank 68. The pyrolysis of the mixed raw material proceeds in the melting furnace 70. Therefore, the second gas line 82 transfers carbon dioxide gas in the melting furnace 70 from the melting furnace 70 to the absorption tank 63, instead of the storage tank 68. In the same way as the above-described embodiment, the amount of carbon dioxide gas generated due to the pyrolysis of the mixed raw material is reduced.

The second gas line 82 transfers carbon dioxide gas in the melting furnace 70 from the melting furnace 70 to the absorption tank 63. In the process, the carbon dioxide gas is cooled by heat radiation, dilution, or the like to a temperature lower than the boiling point of the aqueous solution of the absorption tank 63. At the inlet of the absorption tank 63, the temperature of the carbon dioxide gas is, for example, from 50° C. to 90° C.

The second gas line 82 transfers carbon dioxide gas in the storage tank 68 from the storage tank 68 to the absorption tank 63, and transfers a portion of heat of the carbon dioxide gas in the storage tank 68 to the absorption tank 63.

As described above, the method for producing a mixed raw material, the method for producing molten glass, the method for producing a glass article, the apparatus for producing molten glass, and the apparatus for producing a glass article in accordance with the present disclosure have been described. However, the present disclosure is not limited to the above-described embodiments. Various variations, modifications, substitutions, additions, deletions, and combinations are possible within the scope recited in claims. They are of course within the technical scope of the present disclosure.

What is claimed is:

1. A method of producing a mixed raw material, comprising:
   preparing a glass raw material and an aqueous solution of sodium hydroxide;
   exposing the aqueous solution to carbon dioxide gas, such that the carbon dioxide gas is absorbed in the aqueous solution and sodium hydrogen carbonate is deposited in the aqueous solution;
   mixing the sodium hydrogen carbonate with the glass raw material such that a mixed raw material comprising the sodium hydrogen carbonate and the glass raw material is obtained; and
   heating the mixed raw material before charging the mixed raw material into a melting furnace such that the sodium hydrogen carbonate is converted to sodium carbonate and the carbon dioxide gas is released,
   wherein at least a portion of the carbon dioxide gas released in the heating of the mixed raw material is absorbed in the aqueous solution.

2. The method according to claim 1, wherein the mixed raw material is heated using heat of an exhaust gas from the melting furnace.

3. The method according to claim 1, wherein the mixed raw material is heated at a temperature in a range of 100° C. to 900° C.

4. The method according to claim 1, further comprising:
   acquiring the carbon dioxide gas from an exhaust gas from the melting furnace.

5. The method according to claim 1, further comprising:
   granulating the mixed raw material before charging the mixed raw material into the melting furnace such that a briquette is formed.

6. The method according to claim 1, wherein the mixed raw material is heated at a temperature of from 300° C. to 800° C.

7. The method according to claim 1, wherein the mixed raw material is heated at a temperature of from 500° C. to 800° C.

8. The method according to claim 1, wherein the aqueous solution forms the sodium carbonate in a first tank and deposits the sodium hydrogen carbonate in a second tank.

9. The method according to claim 1, wherein the mixed raw material is heated at a temperature of from 300° C. to 800° C., and the aqueous solution forms the melting furnace in a first tank and deposits the melting furnace in a second tank.

10. A method for producing molten glass, comprising:
charging the mixed raw material obtained by the method of claim 1 into the melting furnace; and
melting the mixed raw material in the melting furnace such that molten glass is obtained.

11. A method for producing a glass article, comprising:
forming the molten glass obtained by the method of claim 10; and
annealing the formed glass, such that a glass article is obtained.

12. A method for producing molten glass, comprising:
charging the mixed raw material obtained by the method of claim 1 into the melting furnace without cooling the mixed raw material to a normal temperature; and
melting the mixed raw material in the melting furnace such that molten glass is obtained.

* * * * *